UNITED STATES PATENT OFFICE 2,679,527

OXYPROPYLATED ESTERS OF SULFO-POLYCARBOXYLIC ACIDS

Melvin De Groote, University City, Mo., assignor to Petrolite Corporation, a corporation of Delaware No Drawing. Application January 29, 1951, Serial No. 208,443

6 Claims. (Cl. 260—481)

The present invention is concerned with certain new products, compounds or compositions of matter which are essentially fractional esters of a tetrabasic acid in which three carboxyl radicals appear in ester form and a sulfo radical appears in salt form. Such compounds can be derived from various tricarboxy acids by sulfonation but for the herein specified purpose are limited to those derived from aconitic acid. Such compounds are derived by reaction involving three types of reagents; (a) polypropylene glycol of a molecular weight sufficient to give water-insolubility and kerosene-solubility, generally being in the molecular weight range of 750 to approximately 3,000; (b) aconitic acid, and (c) an alkali metal bisulfite such as sodium bisulfite or potassium bisulfite.

The present invention is a continuation-in-part of my copending application, Serial No. 186,684, filed September 25, 1950 now Patent 2,602,057.

The preparation of compounds or products previously described involves substantially two steps: (a) Esterification between two moles of the polypropylene glycol and one mole of aconitic acid, and (b) reaction of such fractional ester with a suitable alkali metal bisulfite such as sodium bisulfite.

More specifically, the present invention is concerned with certain hydrophile products of the kind described; said hydrophile synthetic products being characterized by the following formula:

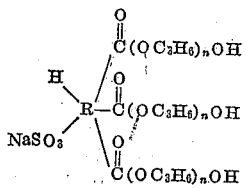

in which

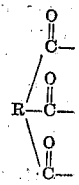

is the trivalent radical of acid and $n$ is a whole number varying from 10 to 80, with the proviso that the polyproylene glycol prior to esterification be water-insoluble and kerosene-soluble.

In the above formula the alkali metal cation is shown as sodium which is the cheapest and most readily available. Needless to say, any other alkali metal cation, such as potassium, may be employed in the form of potassium bisulfite and is included in the hereto attached claims as the obvious chemical equivalent. Similarly, ammonium bisulfite may be employed instead of sodium or potassium bisulfite. This applies also to a bisulfite of various organic bases provided, of course, that such bases prior to forming a sulfite are as basic as ammonia and that the sulfite is water-soluble. All these are the obvious functional equivalents of sodium bisulfite. The procedure is illustrated by the following example:

EXAMPLE 1

In a reaction flask there were placed 9.3 grams of aconitic acid. 325 grams of propylene glycol 2025 (molal ratio of glycol to acid 3:1) along with approximately 1% of toluene sulfonic acid. In this instance 3 grams were used. There was also added 50 cc. of xylene. Heat was applied and refluxing permitted to continue for 3½ hours. The maximum temperature during the reflux period was 120° C. The amount of water which distilled over was approximately 2.7 cc. At the end of the reaction there was still a slight acidity due to possibly uncombined aconitic acid and unquestionably due either entirely or in part to the presence of the acid catalyst. A small amount of 30% aqueous caustic soda was added until sufficient had been introduced to neutralize the free acid radicals. After this adjustment 6 grams of powdered sodium bisulfite were added. Apparently enough water had been added along with the caustic soda to dissolve at least part of the sodium bisulfite so that further addition of water was not required. Needless to say, if no caustic soda solution was added to neutralize the acidity then a little water should be added to dissolve at least part or all of the sodium bisulfite so as to give a saturated solution. The reaction mixture was stirred for three hours. No effort was made to have any reflux take place during this stage of the reaction for the obvious reason that if water were removed and the sodium bisulfite were anhydrous there would be little or no opportunity for reaction. This was necessary also for the reason that sodium bisulfite begins to decompose at about 100° C. and this reaction obviously must be conducted at a suitable temperature until the sodium bisulfite has combined. Thereafter the xylene can be distilled over in the usual manner, removing any water with it and all the xylene can be removed by distillation, particularly vacuum distillation.

The same procedure was followed in connection with a number of additional examples, all of which are illustrated in the following table which gives the reactants, amounts employed, temperature of esterification, etc.

can be used, either on a small scale, pilot plant scale, or larger scale.

In the various examples preceding only one glycol has been used in these cases. Actually there is no reason why one may not use two dif- Table

| Ex. No. | M. W. of Poly-propylene | Amt. Used (grs.) | Di-Carboxy Reactant | Amt. Used (grs.) | Xylene (ccm.) | Max. Esterification Temp., (° C.) | Esterification time (hrs.) | Sod. Bi-sulfite (grs.) | Max. Reaction Temp., (° C.) | Reaction Time (hrs.) |
|---|---|---|---|---|---|---|---|---|---|---|
| 1 | 2,025 | 325 | Aconitic Acid | 9.3 | 50 | 120 | 3½ | 6 | 80-95 | 3 |
| 2 | 725 | 120 | ----do---- | 9.3 | 45 | 127 | 4 | 6 | 80-95 | 3 |
| 3 | 1,025 | 165 | ----do---- | 9.3 | 45 | 130 | 4 | 6 | 80-95 | 3½ |
| 4 | 2,525 | 405 | ----do---- | 9.3 | 55 | 132 | 3½ | 6 | 80-95 | 4 |
| 5 | 1,525 | 245 | ----do---- | 9.3 | 50 | 129 | 4¼ | 6 | 80-95 | 3½ |

Polypropylene glycols are commercially available. Such polypropylene glycols are furnished in various molecular weight ranges. The water-insoluble, kerosene-soluble polypropylene glycols begin in the molecular weight range somewhere above 500 and more specifically at about 700 or 750. The molecular weight was usually determined by the hydroxyl method. Such hydroxyl molecular weight is a fraction, sometimes a large major fraction, of the theoretical molecular weight based on the method of synthesis, i. e., the calculated molecular weight based theoretically on the value one would expect to obtain by treating water or propylene glycol, for example, with propylene oxide. Needless to say, one does not obtain a single compound but a propylene glycol of a molecular weight ratio of 750 or 1,000 or 2,000 as the case may be, and really represents a cogeneric mixture whose statistical average molecular weight is the one indicated. Reference in the table is, of course, to hydroxyl value molecular weight for the obvious reason that this is the basis for calculating the amount of reactants required.

In all instances a small amount of 30% caustic soda solution was used as in the more complete description of Example 1; and also an amount of toluene sulfonic acid, approximately 1% of the weight of the glycol, or slightly less, was used in the esterification step. A larger amount should not be used because there may be decomposition of the glycol. Smaller amounts can be used, for instance, ½% or ¾% based on amount of glycol, provided, however, that the esterification time is extended somewhat.

The products obtained are comparable to the initial glycol in appearance, etc., i. e., usually they are an amber color or at least of a slight straw color, and often somewhat thicker than the original glycol. This description, of course, applies to materials after the removal of the solvent, i. e., the xylene. For use as demulsifiers there is no need to remove the xylene and it may remain behind. Obviously other liquids than xylene may be used in esterification procedure. However, if the boiling point is any higher than xylene there is danger that decomposition may take place unless the amount of sulfonic acid is reduced. Other catalysts such as a small amount of dry hydrochloric acid can be used but it appears less desirable than the sulfonic acid. Needless to say, the caustic soda solution used neutralizes the sulfonic acid catalyst present.

The equipment used in esterification procedure is a resin pot of the kind described in U. S. Patent No. 2,499,370 dated March 7, 1950, to De Groote and Keiser. Any conventional equipment ferent glycols, for instance, an equimolar mixture of two glycols, one for example having a molecular weight of 2000 and the other 3000; or one having a molecular weight of 1500 and the other 2500. Actually these glycols are cogeneric mixtures at each selected molecular weight. Since aconitic acid has three carboxyls one could select glycols of three different molecular weights, for instance, 1500, 2250 and 3000. Momentarily, one need only look at a simple situation, i. e., if maleic acid were employed, i. e., a compound having two carboxyl radicals instead of three. In such event if one does make a mixture of the kind here described actually three types of compounds will appear, one type in which both dicarboxy acid radicals are joined with the lower molecular weight glycol, and one type where one carboxyl is united to a higher molecular weight glycol and the other one to a lower molecular weight glycol.

However, referring to the use of aconitic acid as herein described it becomes obvious that if one used three different glycols the number of possible compounds in the mixture would increase. There is no advantage in using such mixture but it can be done if one cares to do so.

The products so obtained are peculiar insofar that (a) there is not present any radical having 8 or more uninterrupted carbon atoms, and (b) the compounds are not particularly effective as surface-active agents in the ordinary sense due either to the large molecular size or the absence of a hydrophobe radical of the kind previously referred to, or for some other reason which is obscure. The chemical compounds herein employed as demulsifiers have molecular weights varying from more than 1500 up to several thousands, for instance, 6000, 7500 and 9000, and yet contain only one sulfo radical. Utility of such compounds for industrial uses is rather unusual. They are not effective emulsifying agents, but are valuable as an additive or a promoter of emulsions. These compounds also have hydrotropic property and serve as common solvents in the preparation of micellar solution. It is to be noted that they are free from terminal carboxyl radicals and thus differ from reagents obtained, for example, by treating one mole of a high molal polypropyleneglycol with 2 moles of a dicarboxy acid.

As pointed out in the aforementioned co-pending application, Serial No. 186,684, filed September 25, 1950 now Patent 2,602,057, products of the kind above described are suitable for demulsification of petroleum emulsions of the water-in-oil type. Said aforementioned co-pending application is directly concerned with this phase of the invention. However, the utility of these compounds is not limited to this particular field of application but I have found they are useful for other purposes, such as the following, and particularly as additives in the preparation of emulsions. Extremely dilute emulsions, for instance, those in which the dispersed phase is less than two-tenths of a per cent, and usually less than one-tenth of a per cent, have been prepared without using an emulsifying agent. The majority of emulsions, however, are prepared by the use of an emulsifying agent and thus the emulsion system consists essentially of three ingredients. However, many technical emulsions actually have a fourth ingredient which may be an emulsifier of indifferent or inferior effect, but is valuable because it is a coupling agent or mutual solvent. See "The Composition and Structure of Technical Emulsions," J. H. Goodey, Royal Australian Chem. Inst., J. & Proc., 16, 1949, pp. 47–75.

Other uses involve these compounds as break-inducers in the doctor treatment of sour hydrocarbons, as additives to lubricating oils of both the naturally-occurring petroleum type of lubricant and also synthetic lubricants which in many instances are largely polymerized alkylene oxide as described in U. S. Patent No. 2,448,664, dated September 7, 1948, to Fife, et al.

Having thus described my invention, what I claim as new and desire to secure by Letters Patent, is:

1. Hydrophile synthetic products; said hydrophile synthetic products being characterized by the following formula:

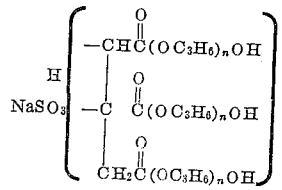

in which $n$ is a whole number varying from 10 to 80; and with the proviso that the polyoxypropylene glycol ether prior to esterification be water-insoluble and kerosene-soluble.

2. The product of claim 1 wherein the value of $n$ is approximately 15.

3. The product of claim 1 wherein the value of $n$ is approximately 25.

4. The product of claim 1 wherein the value of $n$ is approximately 35.

5. The product of claim 1 wherein the value of $n$ is approximately 45.

6. The product of claim 1 wherein the value of $n$ is approximately 55.

References Cited in the file of this patent

UNITED STATES PATENTS

| Number | Name | Date |
|---|---|---|
| 2,072,085 | De Groote et al. | Mar. 2, 1937 |
| 2,305,067 | De Groote | Dec. 15, 1942 |
| 2,315,375 | Nawiasky et al. | Mar. 30, 1943 |
| 2,345,041 | Ericks et al. | Mar. 28, 1944 |